United States Patent
Hintz et al.

(10) Patent No.: US 10,723,084 B2
(45) Date of Patent: Jul. 28, 2020

(54) METHOD FOR PRODUCING A TUBE SKIRT DECORATED WITH AN AESTHETIC LATERAL WELD

(71) Applicant: ALBEA SERVICES, Gennevilliers (FR)

(72) Inventors: Martin Hintz, Bamberg (DE); Sudheer Suvarna, Kent (GB)

(73) Assignee: ALBEA SERVICES, Gennevilliers (FR)

(*) Notice: Subject to any disclaimer, the term of this patent is extended or adjusted under 35 U.S.C. 154(b) by 47 days.

(21) Appl. No.: 15/578,223

(22) PCT Filed: May 26, 2016

(86) PCT No.: PCT/EP2016/061958
§ 371 (c)(1),
(2) Date: Nov. 29, 2017

(87) PCT Pub. No.: WO2016/193130
PCT Pub. Date: Dec. 8, 2016

(65) Prior Publication Data
US 2018/0147791 A1    May 31, 2018

(30) Foreign Application Priority Data
May 29, 2015    (FR) ...................... 15 54846

(51) Int. Cl.
*B29C 65/00*    (2006.01)
*B29C 65/10*    (2006.01)
(Continued)

(52) U.S. Cl.
CPC ........ *B29C 66/4322* (2013.01); *B29C 53/382* (2013.01); *B29C 53/50* (2013.01);
(Continued)

(58) Field of Classification Search
CPC ... B29C 66/4322; B29C 66/71; B29C 66/723; B29C 66/49; B29C 66/72341;
(Continued)

(56) References Cited

U.S. PATENT DOCUMENTS 3,575,769 A    4/1971 Radzio
4,310,369 A *   1/1982 Miller .................... B29C 53/42
                                                        156/218
(Continued)

FOREIGN PATENT DOCUMENTS

DE    4121427        1/1993
DE    4121427 A1 *  1/1993 ............. B29C 53/50
(Continued)

OTHER PUBLICATIONS

EVALTM Resin Grades (http://www.eval.eu/media/30551/eval resins low res.pdf, Internet Archive dated Jun. 17, 2011) (Year: 2011).*
(Continued)

*Primary Examiner* — Michael N Orlando
*Assistant Examiner* — Christopher W Raimund
(74) *Attorney, Agent, or Firm* — Steven M. Greenberg, Esq.; Shutts & Bowen LLP (57) ABSTRACT

A method for producing a tube skirt for a flexible tube, said tube skirt being manufactured from a flat strip 1 comprising a decorative film 15 superimposed on a primary film 16, said primary film 16 comprising a sealable inner layer 14 at the lower surface 20 of the strip 1 as well as two stabilizing layers 11, 13, said decorative film 15 comprising a sealable outer layer 7 at the upper surface 19 of the strip 1, and a decorative layer 8, 9.
This method comprises the following steps:
  winding the flat strip 1 into the form of a sleeve to shape the tube skirt;
  superimposing a first side border 2 of the strip 1 on a second side border 2' of the strip 1 to form an over-
(Continued)

lapping area 3, the sealable inner layer 14 of the primary film 16 of the first side border 2 overlapping the sealable outer layer 7' of the decorative film 15' of the second side border 2';

applying a heating temperature T2 to the inside of the tube skirt at the inner face 22 of the overlapping area 3 to produce the side weld of the tube skirt;

simultaneously with the application of the heating temperature T2, applying compression between the outer 21 and inner 22 faces of the overlapping area 3 so as to finalize the side weld of the tube skirt.

10 Claims, 5 Drawing Sheets (51) Int. Cl.
| | | |
|---|---|---|
| B29C 65/18 | (2006.01) | |
| B29C 65/30 | (2006.01) | |
| B29C 53/38 | (2006.01) | |
| B29C 53/50 | (2006.01) | |
| B29C 53/84 | (2006.01) | |
| B65D 35/08 | (2006.01) | |
| B29L 23/20 | (2006.01) | |
| B29K 23/00 | (2006.01) | |
| B29K 67/00 | (2006.01) | |

(52) U.S. Cl.
CPC ............ *B29C 53/84* (2013.01); *B29C 65/103* (2013.01); *B29C 65/18* (2013.01); *B29C 65/305* (2013.01); *B29C 66/0242* (2013.01); *B29C 66/0342* (2013.01); *B29C 66/1122* (2013.01); *B29C 66/3494* (2013.01); *B29C 66/49* (2013.01); *B29C 66/71* (2013.01); *B29C 66/723* (2013.01); *B29C 66/72321* (2013.01); *B29C 66/72341* (2013.01); *B29C 66/73115* (2013.01); *B29C 66/8181* (2013.01); *B29C 66/81821* (2013.01); *B29C 66/83421* (2013.01); *B29C 66/91423* (2013.01); *B29C 66/91933* (2013.01); *B29C 66/91935* (2013.01); *B65D 35/08* (2013.01); *B29C 66/919* (2013.01); *B29C 2795/002* (2013.01); *B29K 2023/0641* (2013.01); *B29K 2023/086* (2013.01); *B29K 2067/003* (2013.01); *B29K 2995/0067* (2013.01); *B29L 2023/20* (2013.01)

(58) Field of Classification Search
CPC ......... B29C 66/73115; B29C 66/83421; B29C 53/84; B29C 53/50; B29C 53/382; B29C 66/91935; B29C 66/91933; B29C 66/91423; B29C 66/81821; B29C 66/8181; B29C 66/72321; B29C 66/3494; B29C 66/1122; B29C 66/0342; B29C 66/0242; B29C 65/305; B29C 65/18; B29C 65/103; B29C 66/919; B29C 2795/002; B65D 35/08; B29K 2995/0067; B29K 2067/003; B29K 2023/086; B29K 2023/0641; B29L 2023/20
See application file for complete search history.

(56) References Cited

U.S. PATENT DOCUMENTS

| | | | | |
|---|---|---|---|---|
| 5,310,443 | A * | 5/1994 | Burger | B29C 53/50 156/466 |
| 6,250,048 | B1 * | 6/2001 | Linkiewicz | B65B 9/2028 156/497 |
| 6,656,310 | B2 * | 12/2003 | Basque | B29C 65/7433 156/251 |
| 2010/0040820 | A1 * | 2/2010 | Arz | B29C 53/382 428/36.91 |
| 2010/0294390 | A1 * | 11/2010 | Bosshardt | B29C 53/382 138/141 |

FOREIGN PATENT DOCUMENTS

| | | | |
|---|---|---|---|
| JP | S53109785 | 9/1978 | |
| JP | S53109786 | 9/1978 | |
| WO | WO-2015023511 A1 * | 2/2015 | ............ B32B 27/08 |

OTHER PUBLICATIONS

Stehling et al., "Heat Sealing of Semicrystalline Polymer Films. II. Effect of Melting Distribution on Heat-Sealing Behavior of Polyolefins", J. Appl. Polymer Sci., vol. 51, Issue 1 (Jan. 3, 1994). (Year: 1994).*
Butler et al., "Chapter 15, PE Based Multilayer Film Structures", Multilayer Flexible Packaging (2009) (Year: 2009).*

* cited by examiner

METHOD FOR PRODUCING A TUBE SKIRT DECORATED WITH AN AESTHETIC LATERAL WELD

CROSS-REFERENCE TO RELATED APPLICATIONS

This application is a § 371 national phase entry of International Application No. PCT/EP2016/061958, filed May 26, 2016, which claims priority to French Patent Application No. 1554846, filed May 29, 2015.

FIELD OF THE INVENTION

The invention relates to:
a method for manufacturing a decorated flexible tube skirt;
a tooling making it possible to carry out the method for manufacturing the decorated flexible tube skirt.

The strip used in the context of the present invention traditionally comprises several layers of different materials, which combine the various functions that a tube skirt must play, namely flexibility, ability to retain its deformed shape, diffusion barrier (impermeability to steam), printing medium for the decoration, etc.

Indeed, the outer appearance and the decoration are very important in the field of flexible tubes, in particular for cosmetic and toiletry products. The tubes must have decorated outer surfaces, including metallic, holographic, shiny effects, and with a broad color palette.

Flexible tubes are manufactured from a flat multilayer strip that is wound to obtain a sleeve called a tube skirt. The winding is done such that the strip is given a cylindrical shape, the side borders of said strip being arranged across from one another, then welded to one another while forming a side weld.

A tube head, including a dispensing orifice, is next welded to one end of said skirt. The tube thus made is delivered to the packager, upside down and with its dispensing orifice closed off, for example by a capsule screwed on the neck. The packager fills the tube by pouring the product to be packaged through the end of the tube that is still open. Once the tube is filled, its open end is flattened, then welded.

The decoration of the tube is present on the flat strip, before it is converted into a tube skirt. The difficulty lies in obtaining a side weld that is as aesthetically pleasing as possible, i.e., minimally visible and with a decoration coming as close as possible to the weld on either side, while retaining robustness in the weld in order to prevent the products contained in the tube from subsequently leaking or being polluted by moisture or other pollutants.

BACKGROUND OF THE INVENTION

Several techniques exist for producing a side weld of a tube skirt.

The first consists of positioning both side ends of the strip edge to edge, then welding them:
either by having previously beveled the edges such that they become fitted to one another asymmetrically,
or by adding tape at the seam between the edges.

This technique requires high precision regarding the edge-to-edge positioning, which is unfortunately rarely the case, since the guiding of the strip is not easy in tube skirt manufacturing devices.

The second technique consists of covering one edge with the other edge: this is a process with overlap. In this case, the positioning precision is less important, which makes the process easier. The main drawback is that it is generally necessary to avoid any decoration in the overlapping zone due to its lack of resistance to welding conditions. This results in an undecorated line of a certain width visible along the tube in the region of the weld. Additionally, the weld seam is generally clearly visible from the outside, and not aesthetically pleasing.

To resolve this problem, it is known to place a decorative layer between a sealable upper layer and an a lower support layer, so that it is practically not damaged during the side welding step. In this case, the decorative layer extends over the entire surface area of the strip. This decorative layer can also be placed upside down below the lower support layer so as to be better protected, but this technique is expensive and therefore only of interest for large quantities of tube skirts to be produced. In all cases, such a decorative layer only makes it possible to insert a colored and/or shiny and/or metallic "background" on the tube skirt.

The next step consists of performing printing on the strip so that distributors can affix their brand and various information relative to the product poured inside the tube. This step is carried out before the step for forming the sleeve and the side welding step. This is therefore an additional layer added on top of the sealable upper layer. Yet this printing layer is fragile, and the ink tends to creep under the effect of the heat added on top of the overlapping area during welding. It is therefore common practice not to print on both side edges of the strip that will form the overlapping area of the tube skirt, particularly given that many inks exist that are not weldable. The same is true for the protective varnish applied on the inks, which is not weldable.

More specifically, it is common practice to heat both the outer surface and the inner surface of the tube skirt at the overlapping area, so as to melt the material not only on the surface of the overlapping area, but also in the thickness of the overlapping area, which makes it possible to produce a robust weld that holds up over time.

Traditionally, the heating temperature T1 applied on the outer surface of the tube skirt is higher than the heating temperature T2 applied on the inner surface of the tube skirt. The goal is to melt the outer surface before the inner surface is melted, so that the layers near the inner surface, in particular including a barrier layer providing the sealing of the tube skirt, do not have time to mix and therefore create weak points in the overlapping area.

Indeed, for a traditional multilayer strip structure, if T2 was greater than T1, the inner layers would mix upon melting and destroy the strip at the overlapping area, thereby creating weak points for example resulting in a poor sealing barrier no longer guaranteeing optimal storage of the cosmetic product that will be poured inside the tube.

The aim of the present invention therefore consists of proposing a strip structure for a tube skirt that allows a side weld to be formed that is aesthetically pleasing from the outside, and robust enough to preserve the desired barrier effect. This strip structure must also allow the application of a broad ink pallet in the overlapping area of the tube skirt. The invention also aims to propose a method for producing such an aesthetically pleasing and robust side weld, as well as a device making it possible to carry out this method.

BRIEF DESCRIPTION OF THE INVENTION

The present invention runs counter to technical prejudices, by reversing the heating temperatures so as to heat the inner surface of the tube skirt more than the outer surface in the overlapping area to form the side weld.

In this case, the heating temperature T1 applied on the outer surface of the tube skirt is lower than the heating temperature T2 applied on the inner surface of the tube skirt. Given that the heating temperature T2 applied on the inner surface of the tube skirt is higher than in the prior art, there is a risk of deterioration of the layers, in particular the barrier and decorative layers, as well as a risk of significant deformation of the tube skirt at the side weld area.

In order to avoid any deterioration of the layers, a specific structure has been developed to produce the strip forming the tube skirt.

The present invention thus relates to a flat strip, suitable for forming a flexible tube skirt, comprising a decorative film superimposed on a primary film, said primary film consisting of a series of polymeric layers and comprising a sealable inner layer at the lower surface of the strip, said decorative film comprising a sealable outer layer at the upper surface of the strip and a decorative layer.

This strip is primarily characterized in that the primary film comprises means for stabilizing the strip and protecting the decorative layer against heating.

Consequently, the film on which the heating temperature T2 is applied, i.e., the primary film, is consolidated so as to avoid the deformation of the strip forming the tube skirt and to keep a decorative layer in excellent condition even after performing the side weld.

Said stabilization and protection means consist of at least two stabilizing layers made up of ethylene vinyl alcohol (EVOH).

The mechanical behavior of the EVOH differs from that of the other layers because it is more rigid. Even in a softened state after heating to produce the side weld, the EVOH retains its structure and does not mix with the adjacent layers. It thus acts as a frame or reinforcement within the strip, and makes it possible to retain stability in the entire thickness of the overlapping area.

Furthermore, EVOH is a polymeric layer having a barrier effect with respect to oxygen and aromas, which makes it possible to limit aroma or perfume losses of the packaged product. It therefore plays a dual function within the strip.

Advantageously, the presence of two layers of EVOH guarantees the stability of the film.

The distribution of these layers is also important. Indeed, they are arranged symmetrically relative to the median plane of the primary film, and away from one another, so as to be placed in the upper and lower halves of the primary film and not in the center so as to be adjacent. This arrangement allows an optimal distribution of the reinforcements in the thickness of the primary film.

Preferably, the stabilizing barrier layers are each situated at a relatively small distance from the upper and lower surfaces of the primary film, typically 50-120 µm. By decreasing the cumulative thickness of the layers comprised between the upper surface and one of the proximal stabilizing barrier layers on the one hand, and the lower surface and the other proximal stabilizing barrier layer on the other hand, one thus greatly decreases, at least initially, the moisture (and perfume) losses of the product contained in the tube. Even if the stabilizing barrier layer closest to the inside of the tube ends up being deteriorated by the moisture, it slows the diffusion of the moisture and perfumes to the other barrier layer, which remains fully effective for much longer.

The primary film is a film made up of symmetrical layers and obtained by blowing.

The primary film has a completely symmetrical structure with respect to its median plane, i.e., having symmetrical layers with substantially the same thickness and made up of substantially the same material. All of the layers forming the primary film are bonded to one another continuously.

The idea is to try to limit the behavioral heterogeneities of the different layers by targeting the most perfect possible symmetry relative to the median plane of the film, not only geometric but also in terms of the component material, by not settling for the identity of the chemical composition of the base monomer(s). Thus, the symmetrical layers have substantially the same thickness, i.e., thicknesses differing from one another by less than 2 µm for thicknesses smaller than 20 µm and less than 10% for the larger thicknesses.

The symmetrical layers are substantially made up of the same material, i.e., polymers made up not only of monomers with the same chemical composition, but also having macromolecules with comparable lengths, resulting in substantially equal molar masses (mean by number) n M, i.e., differing from one another by less than 10%, preferably less than 5%.

The symmetry relative to the median plane of the film in particular makes it possible to compensate differential shrinkage or deformations between layers occurring on one side of the film with differential shrinkage or deformations between layers occurring on the other side of the film.

It is important for the film to have symmetry at the EVOH layers, which are rigid layers, in order to avoid any risk of unbalanced residual stresses developing.

In order to obtain symmetrical layers, it is common practice to use a blown film.

To obtain such a film, the method consists of co-extruding and inflating a cylindrical multilayer sheath by using an annular co-extrusion die head. The sheath is inflated so as to form a bubble with thin walls that is next pierced and flattened, the inner layer of the sheath being alongside itself.

The double inner layer thus obtained is made by using a material able to adhere to itself under the effect of the flattening pressure of the bulb, at the typical pinching temperature of the bulb, i.e., between 40° C. and 80° C.

This is for example a thermoplastic material such as a linear polyethylene, in particular chosen from among polyethylene hexene copolymers, more specifically a low density linear polyethylene hexene copolymer (LLDPE), a very low density polyethylene (PE-VLD, density comprised between 0.88 g/cm3 and 0.93 g/cm3), a polyethylene obtained with monosite metallocene catalysts, an EVA (ethylene-vinyl acetate copolymer), or grafted copolymers such as an EAA (ethylene-acrylic acid copolymer or ethylene-alkyl acrylate copolymer), in particular an EAA ionomer, for example a Surlyn (trademark registered by the company Dupont de Nemours) or a copolymer (ethylene-acrylic ester) such as an EBA (ethylene-butyl acrylate copolymer) or an EMA (ethylene-methyl acrylate copolymer or ethylene-maleic anhydride copolymer).

Said sealable inner layer and said sealable outer layer are made from medium density polyethylene (MDPE).

Having two sealable layers made from an identical material favors welding between the two layers, since they tend to mix homogeneously when they are in contact with one another and softened by heating. Indeed, the outer sealable layer comes into contact with the inner sealable layer in the overlapping area during shaping of the strip as a sleeve. These two layers must therefore be able to be sealed to one another easily.

Furthermore, these sealable inner and outer layers are also directly in contact with the inner and outer heating means when producing the side weld. Thus, the choice of the material making up these layers is even more important, given that it must be suitable for the heating temperatures.

Advantageously, the selected material must therefore have a relatively high melting point to be lower than the heating temperature T1 applied on the outer surface of the tube skirt so as not to be deteriorated during side welding and to retain an aesthetically pleasing and clean outer appearance. Indeed, it is important to avoid melting of the sealable outer layer and cracking of the nearby inks. In particular, MDPE has a relatively high melting temperature, between 122° C. and 125° C., which makes it possible to have a heating temperature T1 applied on the outer surface of the tube skirt that may reach up to 120° C., without risk of deterioration of the sealable outer layer.

The fluidity index of MDPE, for tests done at 190° C. with a charged piston having a standard mass of 2.16 kg, is between 0.9 and 3.5 g/10 minutes.

Lastly, the density of the MDPE is between 0.930 and 0.935.

The use of MDPE for the sealable inner layer is also advantageous during the last step of producing the tube, where once it is filled with product to be packaged, the open end of the tube is flattened, which means that the round sealable inner layer becomes flattened and forms a double layer of MDPE that can next easily be welded to close the filled tube.

The decorative layer comprises polyethylene terephthalate (PET), and can be provided with a metallic, or holographic, or other coating. The example of metal will be used in the rest of the description.

PET is particularly advantageous inasmuch as it imparts stability to the decorative film. Indeed, unlike PE or PP, PET is significantly more rigid, and has a high density, making it possible to stiffen the decorative film, like the EVOH layers in the primary film. However, PET and metal are heat-sensitive and fragile when heated. This is one additional reason to limit their heating temperature T1, since this decorative layer of metallic PET is situated near the upper surface of the strip, given that the aim is to be able to view the decoration from outside the strip. At the portion of the strip that is covered when forming the tube skirt, the two layers of EVOH situated below the layer of metallic PET make it possible to protect the latter from the heating temperature T2.

On top of the layer of metallic PET, the decorative film comprises additional decorative means, such as an additional printed layer extending over part of the outer surface of the sealable outer layer. Indeed, the layer of metallic PET can form a uniform decorative background, while the printed layer makes it possible to affix a decoration based on designs and writing that can be superimposed and added to the uniform background.

More specifically, the strip comprises a central area bordered by two side borders, said additional printed layer extending over the central area as well as one of the two side borders. Thus, the printed layer does not extend over the entire surface area of the strip. As previously explained, the printed layer is not sealable, and therefore must not cover the strip portion that will be covered when producing the side weld of the tube skirt.

The decorative film comprises an additional layer protecting the printed layer extending over the entire outer surface of the printed layer. Like the printed layer, the protective layer, of the varnish type, is not sealable, and therefore must not cover the strip portion that will be covered when producing the side weld of the tube skirt.

As previously stated, the invention also relates to a tube skirt formed by winding a flat strip as described above, and comprising a side weld with overlapping, a first of said side edges overlapping the second of said side edges.

In this way:
the printed layer extends over the central area as well as the first side border;
the sealable inner layer at the first side border is sealed to the sealable outer layer at the second side border directly, i.e., without interposing additional elements, such as a tape, band or tongue. This refers to a narrow strip interposed at the overlapping area between the sealable inner layer and the sealable outer layer.

The invention also relates to a flexible tube intended to store and dispense liquid to pasty products, and comprising a tube skirt as described above.

The invention also relates to a method for producing a tube skirt for a flexible tube, said tube skirt being manufactured from a flat strip comprising a decorative film superimposed on a primary film, said primary film comprising a sealable inner layer at the lower surface of the strip as well as two stabilizing layers, said decorative film comprising a sealable outer layer at the upper surface of the strip, and a decorative layer.

The method comprises the following steps:
winding the flat strip into the form of a sleeve to shape the tube skirt;
superimposing a first side border of the strip on a second side border of the strip to form an overlapping area, the sealable inner layer of the primary film of the first side border overlapping the sealable outer layer of the decorative film of the second side border;
applying a heating temperature T2 to the inside of the tube skirt at the inner face of the overlapping area to produce the side weld of the tube skirt;
simultaneously with the application of the heating temperature T2, applying compression between the outer and inner faces of the overlapping area so as to finalize the side weld of the tube skirt.

Advantageously, the heating temperature T2 is higher than the melting temperature of the sealable inner layer of the primary film and the sealable outer layer of the decorative film, and lower than the melting temperature of the decorative layer of the decorative film and the two stabilizing layers of the primary film.

Hence the choice of the previously outlined structure, with:
the sealable inner layer of the primary film and the sealable outer layer of the decorative film made up of MDPE, the melting temperature of which is around 122 to 125° C.
the decorative layer of the decorative film made up of PET, the melting temperature of which is about 250° C.
the two stabilizing layers of the primary film made up of EVOH, the melting temperature of which is about 183° C.
the intermediate layers of the primary film (excluding the EVOH layers), the melting temperature of which is comprised between 87° C. and 123° C.

Thus, the temperature T2 must at least reach 125 CC in order to melt the sealable layers and the intermediate layers, which will mix and form the core of the side weld. The temperature T2 must not, however, reach 183° C. so as not to melt the stabilizing layers and the decorative layer, which allow the tube skirt to retain stability and a certain rigidity in the overlapping area. In summary, the temperature T2 will preferably be comprised between 125° C. and 180° C.

Other optional and non-limiting features are set out below:

a heating temperature T1 is applied, simultaneously with the heating temperature T2, on the outer face of the overlapping area: softening the outer face of the tube skirt slightly makes it possible to obtain a weld line that is more melted and less sharp, and therefore less visible to the naked eye.

the heating temperature T1 is lower than heating temperature T2, in other words, when a compression is applied between the outer and inner faces of the overlapping area, the heating temperature T1 to which the outer surface is brought is lower than the heating temperature T2 to which the inner surface is brought. The goal is for about 80% of the heat to come from T2, and only 20% from T1, since the main heating allowing production of the side weld must come from the inside of the tube skirt, and not the outside, in order to have a localized weld seam inside the tube skirt, and therefore not visible from the outside.

the heating temperature T1 is lower than the melting temperature of the material making up the sealable outer layer of the primary film: indeed, the single outer layer must not melt so as to remain uniform and retain an aesthetically pleasing appearance from outside the tube.

the sealable outer layer of the primary film is made up of polyethylene, the melting temperature of which is above 120° C., the heating temperature T1 being lower than 120° C.: this temperature limitation makes it possible to add printing (for the decoration) on the sealable outer layer of the decorative film without the ink creaking and cracking during heating.

the heating temperature T1 is preferably less than 100° C.: this makes it possible to use a more extensive panel of inks.

instead of applying a heating temperature T1, it is possible to carry out a preheating step of the overlapping area before superimposing side borders.

the preheating consists of blowing hot air into the interstitial space separating the first side border from the second side border before they are superimposed.

it is also possible not to apply a heating temperature T1, or preheating, and only to heat the overlapping area from the inside of the tube skirt with T2;

a step for cooling the overlapping area is done after said compression step.

said cooling step consists of cooling the inner face of the overlapping area.

the overlapping area has a width preferably comprised between 1.5 and 2.5 mm.

In order to institute the method for producing the tube skirt, and in particular the side weld, a specific manufacturing device has been established. Indeed, since the inner heating temperature T2 henceforth constitutes the main heating for producing the side weld, it is necessary to next cool the inner face of the overlapping area and not the outer face of the overlapping area, as was common practice. Adaptations of the traditional devices have therefore been necessary.

Traditionally, since T1 is higher than T2, the cooling is primarily done on the outer face of the overlapping area of the tube skirt using a movable cooling strip that also compresses the overlapping area, and drives the tube skirt within the device. This movable strip can provide only outer cooling, or can also provide outer heating upstream from the outer cooling. This is a movable strip closed on itself, driven via pulleys, and developing in parallel with a mandrel around which the flexible strip making up the tube skirt is wound. The main drawback with the use of strips for heating and cooling is that it is difficult to control the temperature of the strip, due to its mobility, thickness, and component material. Furthermore, this is a complex system to implement with the pulleys.

Devices also exist where a cooling system is arranged within the mandrel, on the inner side of the tube skirt, as disclosed in document FR 1,571,778. However, this is a system used to cool the mandrel itself, and the overlapping area indirectly. This cooling system therefore does not perform very well.

The manufacturing device according to the invention comprises a housing, a cylindrical elongated mandrel, means used to advance and guide the flexible strip to shape it in the form of a sleeve around the mandrel, one of the side borders of this strip overlapping the other side border to form an overlapping area to be welded, and inner heating means located in the mandrel to heat the inner face of the overlapping area, and inner cooling means located in the mandrel to cool the inner face of the overlapping area and downstream from the inner heating means.

This device is primarily characterized in that said cooling means is arranged across from the overlapping area and configured to be in direct contact with the overlapping area.

Thus, the cooling means acts directly on the overlapping area of the tube skirt, and does not serve to cool the mandrel. The latter serves solely as a support for the cooling means.

Other optional and non-limiting features are set out below:

said cooling means is fixed in the device.

the cooling means consists of a small cooling strip inserted in a corresponding slot formed in the mandrel.

said small cooling strip includes a channel inside which a coolant circulates.

the small cooling strip includes a planar wall closing the channel in the upper part and being in direct contact with the inner face of the overlapping area.

said channel defines a crenulated inner path.

said channel includes an arrangement of guide fins of the coolant in staggered rows, defining said crenulated inner path.

said fins extend orthogonally from the planar wall toward the central axis of the mandrel.

said fins form two staggered rows oriented along a longitudinal direction parallel to the central axis of the mandrel.

said fins correspond to rectangular tongues.

said slot defines a parallelepiped hollow spaces.

the small cooling strip has a generally parallelepiped outer shape marrying the shape of the walls of said slot.

BRIEF DESCRIPTION OF THE FIGURES

The invention will be better understood, and other aims, details, features and advantages thereof will appear more clearly, during the following explanatory detailed description done of at least one embodiment of the invention, provided solely as an illustrative and non-limiting example, in reference to the appended diagrammatic drawings.

In these drawings.

DETAILED DESCRIPTION

The terms "outer" and "outside" are used to indicate that a layer is oriented toward the outside of the tube skirt thus formed. Likewise, the terms "inner" and "inside" are used to indicate that a layer is oriented toward the inside of the tube skirt thus formed.

Figure 1:
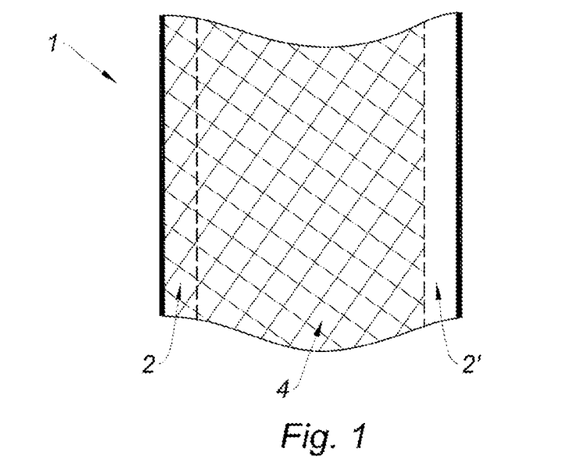
FIG. 1 is a top view of a strip according to the invention.
Figure 2:
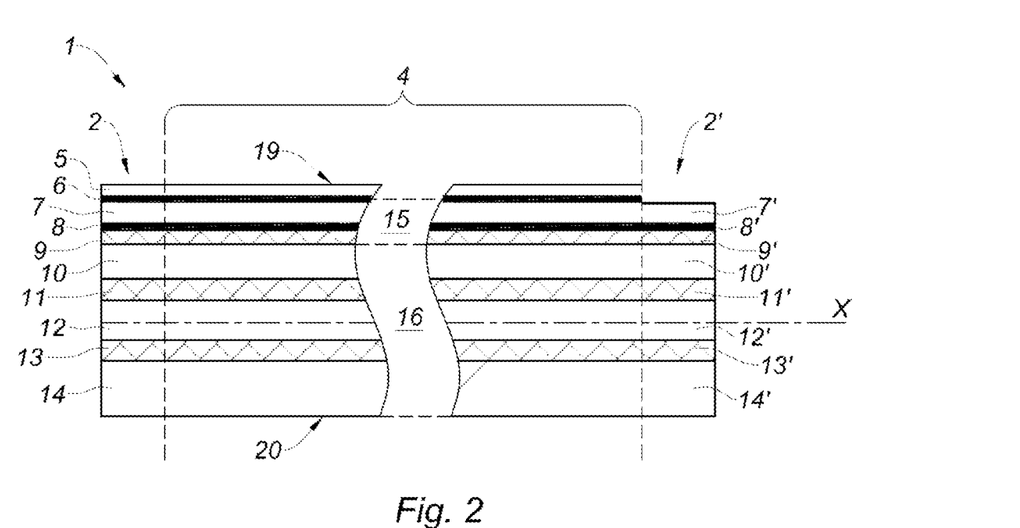
FIG. 2 is a cross-sectional view of the strip of FIG. 1.

In reference to FIGS. 1 and 2, a segment of a flat strip 1 according to the invention is shown, which will next be wound to form a tube skirt.

This strip 1 includes a central area 4 bordered by first 2 and second 2' side borders.

It is known to obtain such a strip 1 by using multilayer films obtained by extrusion or by rolling-gluing.

The flat strip 1 according to the invention includes a series of layers.

Concretely, it is made up of a decorative film 15 topping a primary film 16.

In each embodiment, the decorative film 15 comprises a sealable outer layer 7 situated at the upper surface 19 of the strip 1, and a decorative layer 8, 9 made up of a PET base 9 situated below the sealable outer layer 7.

The decorative layer 8, 9 is applied over the entire surface of the decorative film 15 and is situated below the sealable outer layer 7. In other words, there are no areas belonging to the decorative film 15 that are not covered by both the decorative layer 8, 9 and the sealable outer layer 7.

This decorative layer 8, 9 may contain a metallic or holographic film 8, or the like, depending on the selected type of decoration. It makes up the background of the decoration of the tube that will subsequently be formed.

Preferably, this film 8 is applied on the top of the PET base 9, so that it is oriented toward the upper surface 19 of the strip 1. In another possible configuration, this film 8 could be applied on the bottom of the PET base 9. The PET base consists of a high-density layer, which plays a reinforcing role during the formation of the tube skirt. This layer 9 is crosshatched in FIG. 2.

The decorative layer 8, 9 of the decorative film 15 has a thickness comprised between 5 and 50 µm, preferably between 10 and 30 µm.

In all cases, the sealable outer layer 7 is situated above the decorative layer 8, 9 and therefore protects the latter against impacts/scratches related to futures handling of the tube skirt thus formed. The sealable outer layer 7 is preferably transparent, such that the decoration can be clearly visible from outside the tube that will be formed.

This sealable outer layer 7 is made from PE, and may also have multiple layers. Preferably, the sealable outer layer 7 is made up of three layers of PE. Preferably, the material chosen for the three layers will be MDPE, owing to its technical characteristics.

In general, the sealable outer layer 7 of the decorative film 15 has a thickness comprised between 5 and 90 µm, preferably between 5 and 80 µm.

Optionally, on top of the decorative layer 8, 9, the decorative film 15 can be printed directly on the sealable outer layer 7, in order to add decoration. Thus, an additional printed layer 6, as well as a protective layer 5 (varnish type), can extend over part of the outer surface of the decorative film 8, 9. More specifically, these two printed 6 and protective 5 layers extend over the central area 4 and the first side border 2 of the strip 1. In other words, the two printed 6 and protective 5 layers extend over the entire surface area of the strip 1, aside from the second side border 2' (see crosshatched area in FIG. 1). This is the side border 2' that will be covered by the first side border 2 during formation of the tube skirt. Since the ink and the varnish are not sealable, it is mandatory that none be placed on the second border 2' that will be overlapped to produce the side weld.

The primary film 16 is a multilayer film that comprises a sealable inner layer 14 situated at the lower surface 20 of the strip 1, as well as two stabilizing layers 11, 13 distributed symmetrically in the primary film 16 relative to its median plane X and crosshatched in FIG. 2 to show their reinforcing role.

The primary film 16 may comprise up to 22 layers.

At least one layer consists of a barrier layer making it possible to seal against humidity and preserve aromas relative to the product that will be poured inside the tube thus formed by the wound strip 1.

The other layers may be chosen from among polyethylenes, for example a low-density polyethylene (LDPE), a linear low-density polyethylene (LLDPE), a medium-density polyethylene (MDPE), a high-density polyethylene (HDPE), or a mixture of these polyethylenes, or ethylene vinyl acetate (EVA). Between these different layers, a bonding layer and/or an adhesive coating can be applied in order to improve the adherence between the layers.

The primary film 16 has a thickness comprised between 100 and 500 µm, preferably between 200 and 350 µm.

The primary film 16 can be a blown film, in order to have symmetry between its various layers.

In this case, the double central layer 12 will preferably be made up of EVA, which has a good ability to stick to itself during flattening of the blown sheath. The two stabilizing layers 11, 13 are distributed symmetrically on either side of the median plane X of the film 16 made by the double layer of EVA 12. These stabilizing layers 11, 13 are made up of EVOH. EVOH has also proven to be a material capable of serving as a sealing barrier. Consequently, the two layers of EVOH 11, 13 perform the dual function of reinforcing and sealing within the primary film 16. Lastly, the sealable inner layer 14 also has its liner, situated symmetrically in the primary film 16, corresponding to a sealable outer layer 10 of the primary film 16, and which is therefore in contact with the lower layer of the decorative film 15. The two sealable layers 10, 14 of the primary film 16 are made up of MDPE, in order to correspond to the sealable outer layer 7 of the decorative film 15.

Below are detailed examples of structures forming the strip 1 according to the invention.

EXAMPLE 1

| Layer | Material | Density (g/cm3) | thickness (μm) | Correspondence with FIGS. 1 and 2 | |
|---|---|---|---|---|---|
| 1 | MDPE | 0.934 | 15 | Sealable outer layer 7 | Decorative film 15 |
| 2 | MDPE | 0.934 | 22 | | |
| 3 | MDPE | 0.934 | 13 | | |
| 4 | Adhesive coating | | 4 | Adhesive layer | |
| 5 | PET + metallic film (toward the bottom) | 1.417 | 12 | Decorative layer 8, 9 | |
| 6 | Adhesive coating | | 4 | Adhesive layer | |
| 7 | MDPE | 0.934 | 109 | Sealable outer layer 10 | Primary film 16 |
| 8 | Resin | 0.91 | 7 | Adhesive layer | |
| 9 | EVOH | 1.17 | 10 | Stabilizing layer 11 | |
| 10 | Resin | 0.92 | 7 | Adhesive layer | |
| 11 | EVA | 0.941 | 17 × 2 | Central layer 12 | |
| 12 | Resin | 0.92 | 7 | Adhesive layer | |
| 13 | EVOH | 1.17 | 10 | Stabilizing layer 13 | |
| 14 | Resin | 0.91 | 7 | Adhesive layer | |
| 15 | MDPE | 0.934 | 109 | Sealable inner layer 14 | |

EXAMPLE 2

| Layer | Material | Thickness (μm) | Correspondence with FIGS. 1 and 2 | |
|---|---|---|---|---|
| 1 | MDPE | 15 | Sealable outer layer 7 | Decorative film 15 |
| 2 | MDPE | 22 | | |
| 3 | MDPE | 13 | | |
| 4 | Adhesive coating | | Adhesive layer | |
| 5 | metallic film (toward the top) + PET | 12 | Decorative layer 8, 9 | |
| 6 | Adhesive coating | | Adhesive layer | |
| 7 | MDPE | 72 | Sealable outer layer 10 | Primary film 16 |
| 8 | Resin | 7 | Adhesive layer | |
| 9 | EVOH | 7 | Stabilizing layer 11 | |
| 10 | Resin | 7 | Adhesive layer | |
| 11 | MDPE | 40 | | |
| 12 | EVA | 17.3 × 2 | Central layer 12 | |
| 13 | MDPE | 40 | | |
| 14 | Resin | 7 | Adhesive layer | |
| 15 | EVOH | 7 | Stabilizing layer 13 | |
| 16 | Resin | 7 | Adhesive layer | |
| 17 | MDPE | 72 | Sealable inner layer 14 | |

Figure 3:
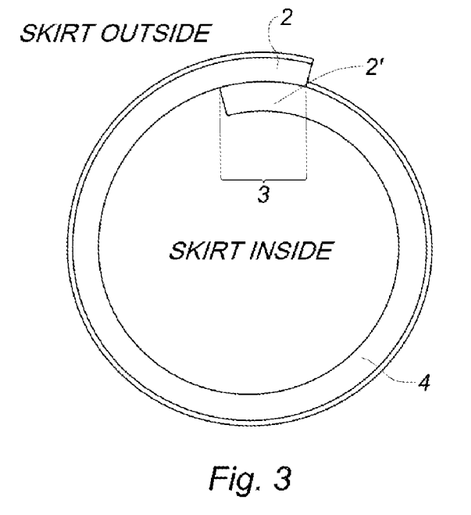
FIG. 3 is a cross-sectional view of a tube skirt formed from the strip of FIG. 1.

During the formation of the tube skirt, by winding the strip 1, the first side border 2 overlaps the second side border 2', as illustrated in FIG. 3.

Figure 4:
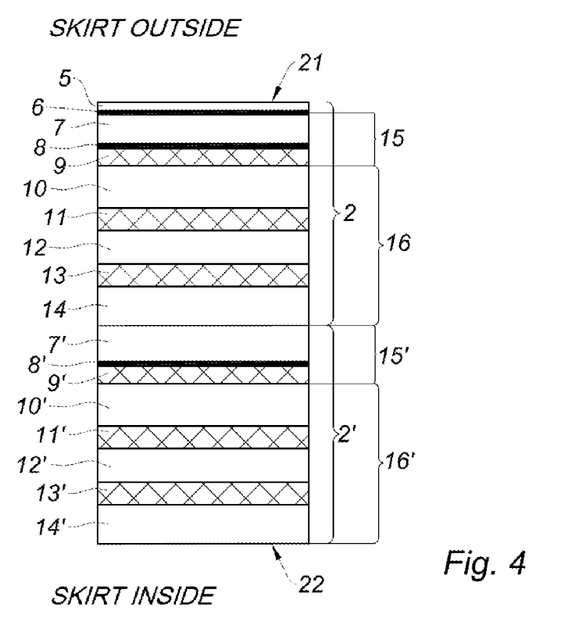
FIG. 4 lists the different layers at the overlapping area of the tube skirt of FIG. 3.

FIG. 4 shows the series of layers in the overlapping area 3.

For better clarity, the layers situated at the second side border 2' have a numbering corresponding to the layers situated at the first side border 2, since they are the same layers, but are numbered with an additional "prime" to differentiate them.

In order, from the outside of the tube skirt toward the inside of the tube skirt, the layers are as follows:

5: the protective layer of the first side border
6: the printed layer of the first side border
7: the sealable outer layer of the decorative film of the first side border
8: the metallic coating of the decorative film of the first side border
9: the PET layer bearing the metallic coating of the decorative film of the first side border
10: the sealable outer layer of the primary film of the first side border
11: the stabilizing EVOH layer of the primary film of the first side border
12: the central layer of the primary film of the first side border
13: the stabilizing EVOH layer of the primary film of the first side border
14: the sealable inner layer of the primary film of the first side border
7': the sealable outer layer of the decorative film of the second side border
8': the metallic coating of the decorative film of the second side border
9': the PET layer bearing the metallic coating of the decorative film of the second side border
10': the sealable outer layer of the primary film of the second side border
11': the stabilizing EVOH layer of the primary film of the second side border
12': the central layer of the primary film of the second side border
13': the stabilizing EVOH layer of the primary film of the second side border
14': the sealable inner layer of the primary film of the second side border The adhesive intermediate layers are not shown for greater clarity.

It should be noted that the sealable inner layer 14 of the primary film 16 of the first side border 2 is indeed situated directly on the sealable outer layer 7' of the decorative film 15' of the second side border 2'. These two sealable MDPE layers 14, 7' will melt and fuse during the side welding, thereby allowing the two side borders 2, 2' to be welded to one another.

Figure 5:
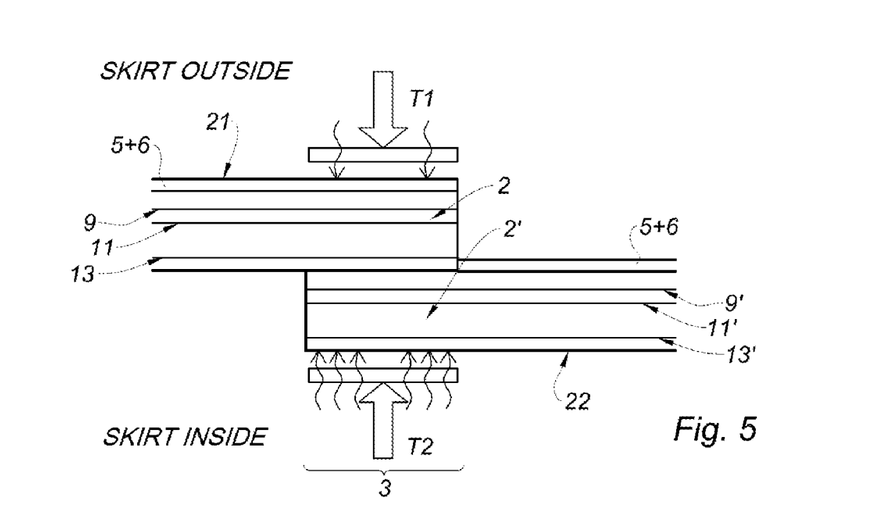
FIG. 5 shows the overlapping area of the tube skirt of FIG. 3 before producing the side weld, according to a first embodiment.

FIG. 5 precisely shows the overlapping done to form the tube skirt, before producing the side weld, and according to a first embodiment. In this case, a heating temperature T2 comprised between 125° C. and 180° C. is applied on the inner surface 22 of the tube skirt, more specifically on the sealable inner layer 14' of the primary film 16' of the second MDPE side border 2'.

At the same time, a heating temperature T1, much lower than the heating temperature T2 and below 120° C., is applied on the outer surface 21 of the tube skirt, more specifically on the sealable outer layer 7 of the decorative film 15 of the first MDPE side border 2.

At the same time as the heating, the overlapping area 3 is compressed at both its outer 21 and inner 22 faces in order to help the melting layers mix and adhere to one another so as to produce the side weld of the tube skirt.

Concretely, the following layers will melt owing to the heating temperature T2:

14: the sealable inner layer of the primary film of the first side border

7': the sealable outer layer of the decorative film of the second side border

10': the sealable outer layer of the primary film of the second side border

12': the central layer of the primary film of the second side border

14': the sealable inner layer of the primary film of the second side border

The intermediate bonding layers will also melt.

The stabilizing layers 11, 11', 13, 13' and the decorative metallic PET layers 8, 9, 8', 9' will not melt and will not mix with the other layers, thereby making it possible to preserve order in the layers during welding and after welding, and to retain stability in the heated structure.

The two stabilizing EVOH layers 11, 13 of the primary film 16 of the first side border 2 also make it possible to protect the decorative metallic PET layer 8, 9 from heating coming from the heating temperature T2, since the metallic PET layer is sensitive to heating and becomes fragile.

Figure 7:
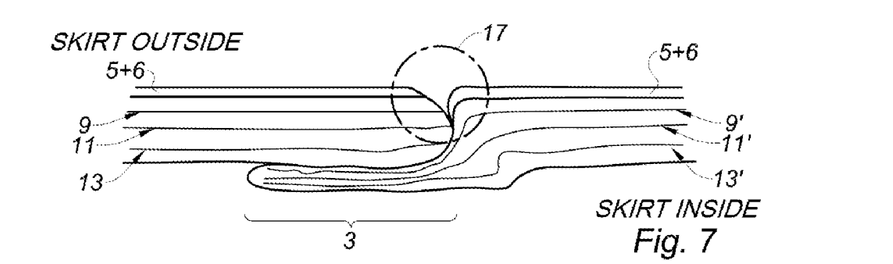
FIG. 7 shows the overlapping area of the tube skirt of FIG. 3 after producing the side weld, for the first and second embodiments.

This is particularly visible in FIG. 7, where the deformations of the different layers are shown after producing the side weld. It is clearly visible that the stabilizing layers 11, 11', 13, 13' and the decorative metallic PET layers 8, 9, 8', 9' are not mixed with the other layers and have simply been deformed under the action of the compression. The layers upstream from, downstream from, and between the stabilizing layers have been mixed and fused. The weld seam is indeed located inside the tube skirt.

It should be noted that the metallic PET layer 8', 9' of the second side border 2' has also been protected against heating by two stabilizing EVOH layers 11', 13' of the second side border 2', in particular in the new junction area 17 between the two side borders 2, 2' on the surface area of the tube skirt.

This junction area 17 is very narrow, the two borders 2, 2' being very close, and the discontinuity of the printed layer 6 on the tube skirt is thus minimal. The tube skirt thus formed is aesthetically pleasing, and has a robust weld.

Figure 6:
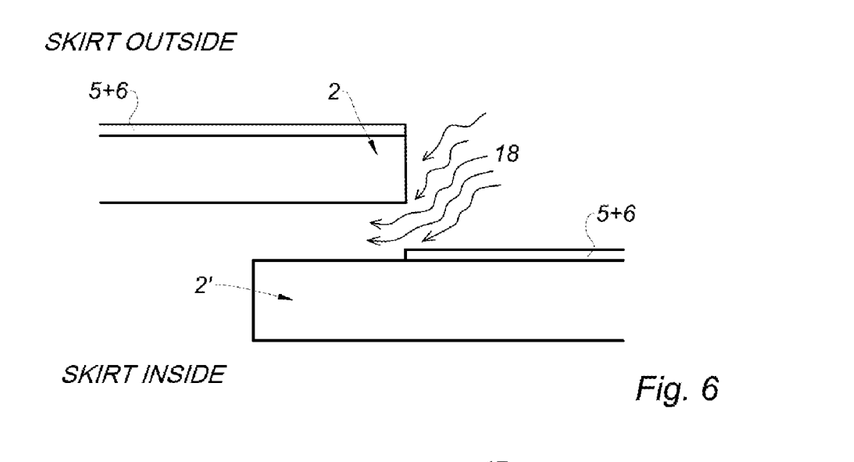
FIG. 6 shows the overlapping area of the tube skirt of FIG. 3 before producing the side weld, according to a second embodiment.

In a second embodiment, instead of applying a heating temperature T1 on the outer surface 21 of the tube skirt, it is possible to preheat the overlapping area 3 by blowing hot air 18 into the interstitial space separating the first side border 2 from the second side border 2' before they are superimposed, as illustrated in FIG. 6.

The goal is to soften the layers beforehand that are intended to melt during the side welding, in particular the layers oriented toward the outside of the tube skirt, in order to obtain a weld with a uniform appearance from the outside of the tube skirt.

The end result is similar to that of the first embodiment, and corresponds to that shown in FIG. 7.

Figure 8:
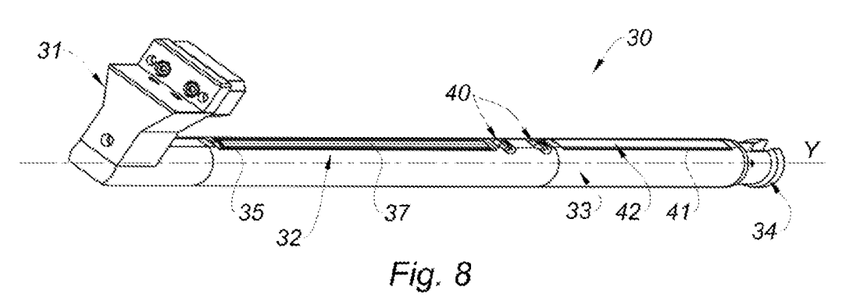
FIG. 8 is a perspective view of part of the tooling needed to produce the side weld of the tube skirt of FIG. 3.

FIG. 8 shows tooling suitable for carrying out the manufacturing method as previously described.

This tooling primarily involves a cylindrical mandrel 30 extending longitudinally along an axis Y, and able to be fastened on a frame (not shown). This mandrel 30 is made up of a first end segment 31, an inner heating segment 32, an inner cooling segment 33, and a second end segment 34.

The flexible strip (not shown) is guided so as to wind around the mandrel 30, and such that a first side border of the strip overlaps a second side border of the strip, thus forming an overlapping area situated in the upper part of the mandrel 30. The part of the device allowing winding of the strip will not be described, since it has been known and widely used for many years.

Figure 11:
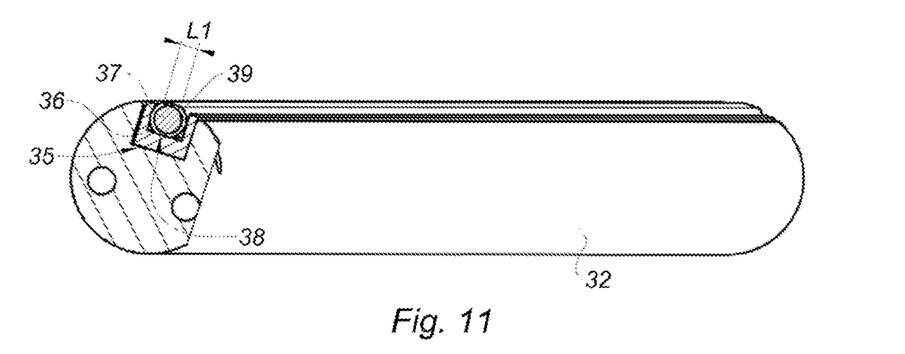
FIG. 11 is a detailed view of the heating device belonging to the tooling of FIG. 8.

The overlapping area of the tube skirt thus formed first arrives at the inner heating segment 32 of the mandrel 30, more specifically shown in FIG. 11. This segment 32 comprises a slot 35 formed in the upper part of the mandrel 30, in which an insulating part 36 is housed able to accommodate a heating part 37 that will be in contact with the inner face of the overlapping area to produce the side weld.

The slot 35 has a parallelepiped shape. The insulating part 36 is U-shaped with its angular outer walls marrying the shape of the slot 35 of the mandrel 30.

The heating part 37 consists of a cylinder whereof the lower 38 and upper 39 parts comprise a flat respectively allowing it to be positioned correctly at the bottom of the insulating part 36 with planar contact, and to have an upper planar surface 39 with a width L1 that corresponds at least to that of the overlapping area. This heating part 37 thus positioned can heat the inner face of the overlapping area to the heating temperature T2, in order to produce the side weld. In parallel, a movable metal strip (not shown) presses on the outer face of the overlapping area in order to exert compression on the overlapping area and help the various melting layers mix and ensure that there is no setback at the overlapping area, i.e., that the outer surface of the tube skirt is linear over its entire circumference. This compression also makes it possible to reduce the ultimate thickness of the side weld.

Optionally, an outside heating means (not shown) located across from the mandrel 30 can be provided on the device to heat the outer face of the overlapping area to the heating temperature T1. This heating means can be associated with the movable strip.

When the side weld is produced, the tube skirt, in particular driven via the movable metal strip, arrives at the central part of the mandrel 30 where casters 40 are arranged having a traditional compression and shaping function of the tube skirt at the overlapping area.

Figure 9:
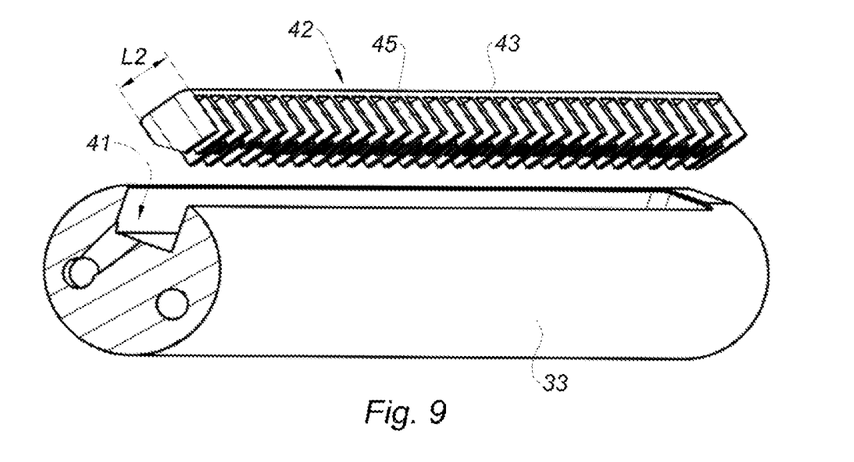
FIG. 9 is an exploded view of the cooling device belonging to the tooling of FIG. 8.

Then the tube skirt arrives at the cooling segment 33 of the mandrel 30, shown in more detail in FIG. 9. This segment 33 also includes a slot 41 formed at the upper surface of the mandrel 30. This slot 41 forms a hollow parallelepiped space.

Within this slot 41, a small cooling strip 42, also parallelepiped, is housed. The dimensions of the small strip 42 and the slot 41 coincide in order to ensure optimal positioning in one another. The small strip 42 is therefore fixed within the mandrel 30.

This small strip 42 comprises a flat upper wall 43 that is arranged and able to come directly into contact with the inner face of the overlapping area. The latter will therefore be cooled via this planar contact with the flat wall 43 of the small strip 42. The cooling temperature is therefore regulated from the temperature measured on the surface of the flat wall 43. This upper wall 43 has a width L2 at least as large as that of the overlapping area so as to cool the entire side seam well.

Figure 10:
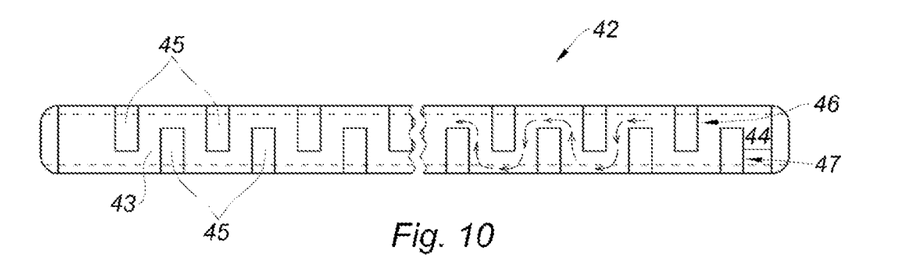
FIG. 10 shows the details of the small cooling strip of the cooling device of FIG. 9.

Below this flat wall 43 is a channel 44 inside which a coolant circulates. In the present example, this channel 44 has a crenulated shape, as illustrated in FIG. 10. Indeed, a plurality of fins 45 extend perpendicular to the flat wall 43 of the small strip 42 toward the central axis Y of the mandrel 30. These fins 45 form two longitudinal rows 46, 47 developing along an axis parallel to the axis Y of the mandrel 30, and are arranged in staggered rows so as to form the crenulation. The coolant thus circulates between the fins 45, following the crenulated path 44, as illustrated by the arrows. This path 44 forces the fluid to cross, and thus spend more time within, the small strip 42 in order to favor heat exchanges.

The fins 45 make it possible to increase the heat exchange surface between the overlapping area, still hot after the welding, on the one hand, and the cold coolant, on the other hand. By increasing the exchange surface in this way, the cooling performance is also increased. Thus, the length of the cooling segment 33 of the mandrel 30 according to the invention can be greatly reduced while obtaining optimal cooling results relative to a cooling device without fins 45, and/or having a rectilinear cooling channel 44. The mandrel 30 according to the invention therefore has the advantage of being compact.

Preferably, the fins 45 consist of rectangular tongues. However, they could have other advantageous shapes.

The same is true for the cooling channel 44, which may assume other advantageous forms.

During the cooling step, the overlapping area preferably continues to be compressed via the movable strip.

The invention claimed is:

1. A method for producing a tube skirt for a flexible tube, said tube skirt being manufactured from a flat strip comprising a decorative film superimposed on a primary film, said primary film comprising a sealable inner layer at the lower surface of the strip as well as two stabilizing layers which import rigidity to a seam area and act as a reinforcement, said decorative film comprising a sealable outer layer at the upper surface of the strip, and a decorative layer, said method comprising:

winding the flat strip into a form of a sleeve to shape the tube skirt;

superimposing a first side border of the strip on a second side border 2' of the strip to form an overlapping area, the sealable inner layer of the primary film of the first side border overlapping the sealable outer layer 7' of the decorative film 15' of the second side border 2';

applying a heating temperature to the inside of the tube skirt at the inner face of the overlapping area to produce the side weld of the tube skirt;

simultaneously with the application of the heating temperature, applying compression between the outer and inner faces of the overlapping area so as to finalize the side weld of the tube skirt, wherein a different heating temperature is applied, simultaneously with the heating temperature applied to the inside of the tube skirt, on the outer face of the overlapping area, the different heating temperature being lower than the heating temperature applied to the inside of the tube skirt.

2. The method according to claim 1, wherein the heating temperature is higher than a melting temperature of the sealable inner layer of the primary film and the sealable outer layer of the decorative film, and lower than a melting temperature of the decorative layer of the decorative film and the two stabilizing layers of the primary film.

3. The method according to claim 1, wherein the different heating temperature is lower than a melting temperature of material making up the sealable outer layer.

4. The method according to claim 3, wherein the material making up the sealable outer layer comprises polyethylene, and wherein the melting temperature of the material is above 120° C., and the different heating temperature is lower than 120° C.

5. The method according to claim 4, wherein the different heating temperature is less than 100° C.

6. The method according to claim 1, further comprising preheating the overlapping area before superimposing the side borders.

7. The method according to claim 6, wherein the preheating comprises blowing hot air into an interstitial space separating the first side border from the second side border 2' before the superimposition of the first side border on the second side border.

8. The method according to claim 1, further comprising cooling the overlapping area after the application of the compression.

9. The method according to claim 8, wherein the cooling comprises cooling the inner face of the overlapping area.

10. The method according to claim 1, wherein the overlapping area has a width between 1.5 and 2.5 mm.

* * * * *